United States Patent [19]
MacLaren et al.

[11] Patent Number: 5,617,515
[45] Date of Patent: Apr. 1, 1997

[54] METHOD AND APPARATUS FOR CONTROLLING AND PROGRAMMING A ROBOT OR OTHER MOVEABLE OBJECT

[75] Inventors: Brice K. MacLaren, Huntsville; Randall L. Johnson, Madison; Judson R. Griffin, III; James R. Meehan, both of Huntsville, all of Ala.

[73] Assignee: Dynetics, Inc., Huntsville, Ala.

[21] Appl. No.: 273,480

[22] Filed: Jul. 11, 1994

[51] Int. Cl.⁶ .............................. G06K 7/10; G01B 11/24
[52] U.S. Cl. .............................. 395/99; 395/86; 395/89; 395/93; 414/5
[58] Field of Search ............................... 395/86, 89, 93, 395/99; 414/5

[56] References Cited

U.S. PATENT DOCUMENTS

| | | | |
|---|---|---|---|
| 4,409,718 | 10/1983 | Pryor | 29/407 |
| 4,611,292 | 9/1986 | Ninomiya et al. | 364/559 |
| 4,745,557 | 5/1988 | Pekar et al. | 364/474 |
| 4,839,838 | 6/1989 | LaBiche et al. | 364/709.11 |
| 4,855,909 | 8/1989 | Vincent et al. | 364/413.01 |
| 4,862,152 | 8/1989 | Milner | 340/712 |
| 5,010,241 | 4/1991 | Butterworth | 235/462 |
| 5,193,963 | 3/1993 | McAfee et al. | 414/5 |
| 5,337,149 | 8/1994 | Kozah et al. | 356/376 |

OTHER PUBLICATIONS

"Gyro Chip," *Systron Donner Inertial Division*, A BEI Electronics Co., 1 page—unnumbered, undated.
"Gyro Chip, Application Note#1, Installation," *Systron Donner Inertial Division*, A BEI Electronics Co., Sep. 9, 1993, 4 pp.
"Gyro Chip, Application Note#3, Integration," *Systron Donner Inertial Division*, A BEI Electronics Co., Sep. 9, 1993, 2 pp.

Primary Examiner—George B. Davis
Attorney, Agent, or Firm—Needle & Rosenberg, P.C.

[57] ABSTRACT

A hand-held controller wand including three angular rate measurement sensors is coupled to a computational device for translating roll, pitch, and yaw data into translation and rotation signals or commands that effect the movement of an external device's control point, which may be an end effector of a robot. A transformation matrix is continually updated from the angular rate information obtained from the hand-held controller. This matrix is used to update a direction vector. A value may be stored in the computation device corresponding to a predetermined speed of movement. A button or other convenient control allows the operator to control translational movement of the end effector or other controlled device in a direction defined by the orientation of the hand held controller at the predetermined speed, thus providing an intuitive control input for real-time direction and programming of movement. Because the present orientation of the wand is also known to the computational device, rotational movement may also be directed. Translation and orientation motion input may be provided simultaneously or separately, in accordance with the programming and/or under control of the computational device. The computational device translates the computed direction vector into signals corresponding to commands that depend upon the device being controlled; such translation is especially suited for robot controllers, because such controllers accept simple movement commands that may readily be computed from the direction vectors. However, the controller is also useful for other applications in which motion information is required, including the motion of real objects and virtual reality.

17 Claims, 9 Drawing Sheets

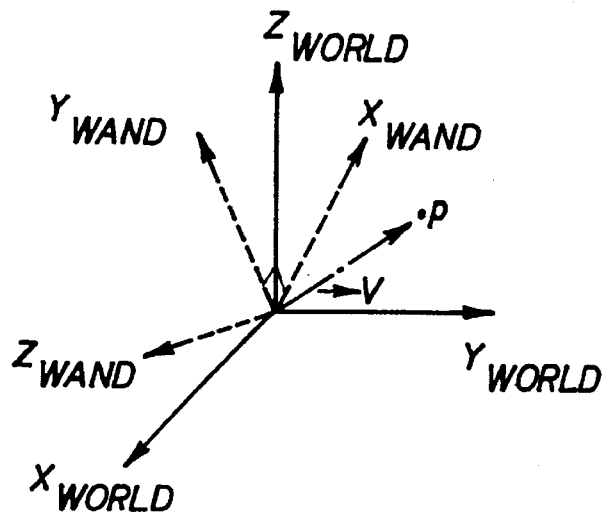
FIG 5
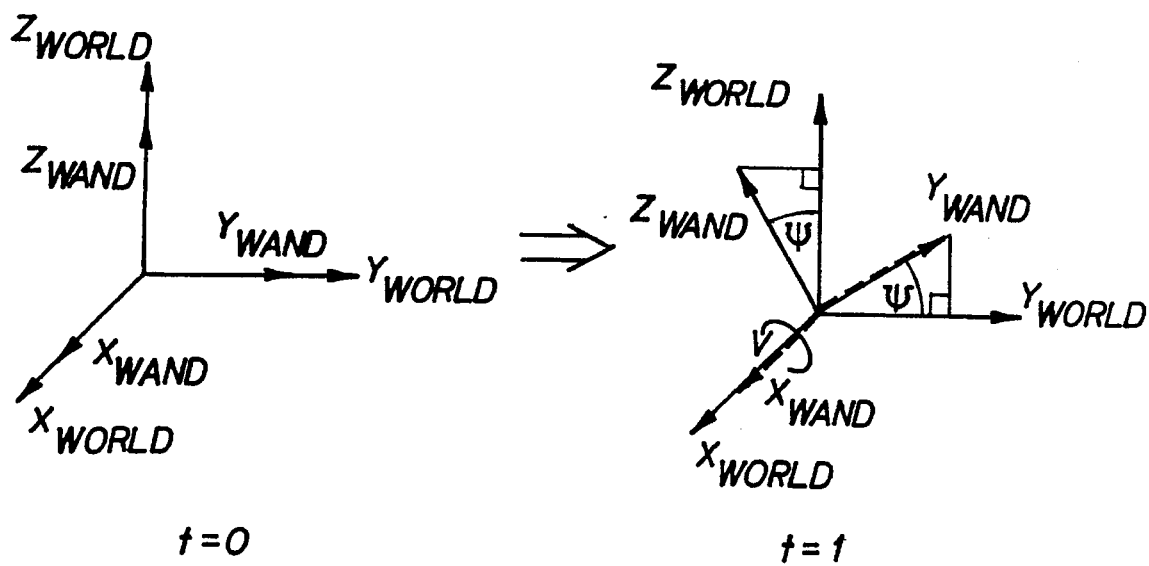
FIG 6A  FIG 6B

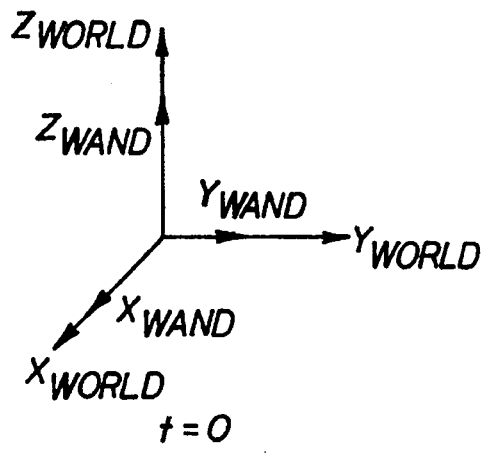
FIG 7A
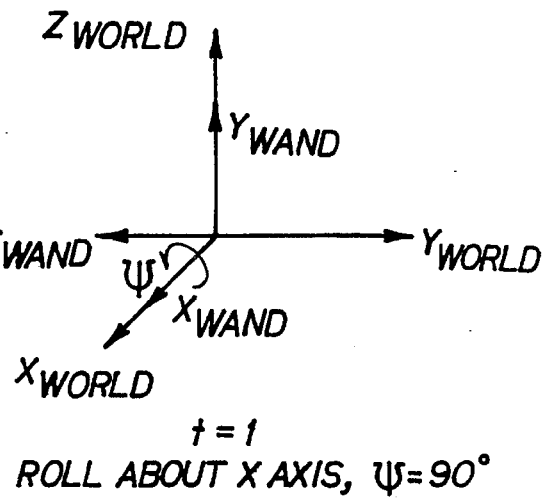
FIG 7B
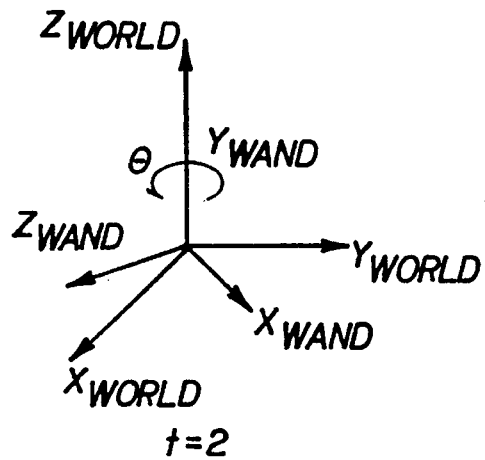
FIG 7C
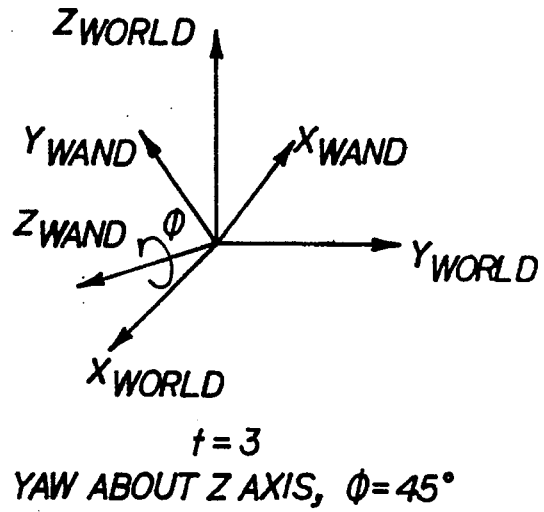
FIG 7D
$[A]_{0,1} = [I]$      STEP 1: CALIBRATION
$[A]_{1,2} = RPY(\theta, \phi, \psi)$ STEP 2: FORM CURRENT RPY TRANSFORMATION MATRIX
$[A]_{0,2} = [A]_{1,2} [A]_{0,1}$ STEP 3: UPDATE TOTAL TRANSFORMATION MATRIX
⋮      STEP 4: ITERATION OF STEPS 2-3
⋮
$[A]_{0,n} = [A]_{m,n} [A]_{0,m}$
FIG 8

METHOD AND APPARATUS FOR CONTROLLING AND PROGRAMMING A ROBOT OR OTHER MOVEABLE OBJECT

BACKGROUND OF THE INVENTION

1. Field of the Invention

This invention relates to a method and apparatus for controlling a movable object, and more particularly to a method of positioning, orienting, and programming movements of a tool held by a robot arm, and an apparatus therefor.

2. Discussion of the Prior Art

Many activities involve control of the movement of an object in a three-dimensional space. So-called "real time" manipulation of graphic objects in computer simulations, e.g. video games, flight simulators, virtual reality, etc., is an example. Another is the control and programming of industrial robots, particularly the robot arms used in assembly operations to manipulate tools such as spray painters or welders. Such control is achieved using various control systems, typically digital controllers implemented in computers, which move the tool along either a precalculated trajectory or a reference trajectory provided by spatial input devices such as keypads, joysticks or trackballs, in a teach-repeat mode or in real time.

While programmable robots in these applications perform repetitive and often dangerous tasks more efficiently than human, they must be programmed by humans. A programmer typically must direct the robot in a stepwise manner through each detail of each task to be performed with only the aid of a keyboard or a handheld keypad called a "teach pendant." Because of the design of these teach pendants, this progrmming has been done by moving or rotating the robot arm along one axis at a time in a domain with typically four to six degrees of freedom. with constant, careful observation of where the tool, or end effector is located. Complex motions are very time consuming to program because of the nature of the programming tools in use today. Robots are typically programmed by moving the robot arm in separate or "decoupled" orthogonal straight-line or rotational movements parallel to or around the axes of the reference coordinate frame or around axes of various robot joints. Thus, each movement must be taught as a combination of individual points on a spline. However, the orientation of the reference coordinate frame is not always immediately evident or intuitive to the programmer, thus making it necessary to jog the robot arm to see if a particular command to be programmed causes motion in the intended direction. Aside from being inefficient and time-consuming, programming in this way can be destructive or even dangerous, since an improper movement of the robot during programming could damage or destroy a tool or a workpiece, possibly endangering personnel in the vicinity.

Also, present-day robotic controllers use inconsistent user interfaces, both between different manufacturers and even between different model robots of the same manufacturers. Thus, when a robot needs to be reprogrammed, adjusted, or replaced, a person trained in the idiosyncrasies of a particular user interface must typically be brought in or on staff to do the required work. Although others could be trained to use a new user interface, the cost of running an assembly line can be so high (on the order of $15,000 to $25,000 per minute in some automotive assembly lines) that an inefficient or error-prone programmer cannot be tolerated.

While inconsistent or non-standard user interfaces are the norm in the robotics industry, most robots are provided with programming languages that can readily accept data corresponding to the robot's workvolume and desired coordinate frames (i.e., world, tool). Also, the typical robot controller can readily translate arbitrary move-to and rotate-to commands into joint angle data, and into the control signals needed to move the robot arm into the desired position.

Joysticks and trackballs have been used as spatial input devices for programming robots, but they are incapable of providing sufficiently intuitive controls corresponding to each of all the possible movements of a robot arm. For example, while it is simple enough to provide three degrees of freedom in trackball with sensors and map rotations of the trackball into forward, reverse, and right-left motion corresponding to orthogonal movements of the robot arm in a plane, to use the trackball for directing the robot in a third translational direction, it is necessary to provide sensors for detecting rotation of the trackball about a third orthogonal axis. Unfortunately, while the other two orthogonal motions of the trackball can be intuitively related to the motion of the robot arm (i.e., left-fight and up-down motions of the wrist vs. the same linear motion of the robot arm), the third motion requires a twisting motion of the wrist which does not intuitively correspond to the third orthogonal motion of the robot arm. While a separate control can be added for this third translational motion, its use would be difficult and nonintuitive.

Ideally, a spatial input device replacing a teach pendant should also have the capability of providing simple commands that restrict motion of the robot as desired. Consider, for example, a robot arm spray painting the side of a van on an assembly line. If it is known that the (possibly irregularly-shaped) workpiece is to be positioned at a fixed position, it may be desirable to ensure that, whatever manipulation is done to the robot arm, the endeffector remains a fixed distance (or at a fixed orientation) relative to the nearest part of the workpiece. In the spray painting example, motion commands to the robot controller could be constrained to ensure that the spray painting nozzle at the end of the robot arm is maintained at a fixed distance and angle with respect to the side of the van and travels at a uniform speed, ensuring a uniform paint coating. During programming of the robot, such constraints could protect the tool, the robot arm, and the workpiece from damage. Perhaps more importantly, movements of the robot arm could be confined within a limited volume of space to protect workers who must be on the factory floor while robots are operating—including, of course, those who program the robots.

Aside from teach pendants and track balls, other programming devices are known. Linkages are devices that resemble the device they control; for example, a four degree of freedom linkage would control a four degree of freedom robot. However, these linkages are usually table mounted, and intuitive control is lost if the device is taken off the table. Also, linkages also have a limited range of motion. Gloves and other anthropomorphic devices used as controllers and programming input devices physically and undesirably tie the operator to the computer. This type of device also does not provide intuitive control for translational movement, and are difficult to implement if the person using the glove or other device is not stationary in his position within the work volume. Devices relying on emitter/receiver technology, such as IR and acoustic transmitters and receivers usually have limited range and are primarily limited to line of sight control. These devices do not work well in noisy industrial environments.

There is thus a need for an easy-to-use, intuitive real-time 6 DOF (degrees of freedom) input device to replace difficult-to-use teach pendants and unintuitive joysticks and trackballs. This input device should provide intuitive control no matter where a use is positioned or oriented in the workplace, and should not require table mounting or have to be within a line of sight from a sensor and with no limitation as to the type of environment. It would further be desirable to provide both simple and complex motion control (i.e., essentially simultaneous motion in several reference directions at the same time) with the same device using easily understood commands. Moreover, it would be highly advantageous to provide both an unlimited range of motion commands when desired as well as a means for constraining motion commands from the spatial input device to provide, for example, confinement of robot motion to a fixed volume of space, "smoothing" of a tool trajectory, or a maintenance of constant distance between a tool and a workpiece. It would also be advantageous to provide both coarse and fine motion control.

In addition to uses in robotics, an input device having the desired characteristics could be used to input 6 DOF motion for any hardware or virtual object or device, such as cranes, flight simulators, or computer simulated devices or objects, either to program these devices or to provide real-time, simultaneous 6 DOF control.

BRIEF DESCRIPTION OF THE INVENTION

According to one aspect of the invention, a motion input device comprises a hand controller including three angular measurement sensors to track the hand controller's orientation in space. The motion input device further comprises a computational means for interpreting signals corresponding to relative orientation changes of the angular sensors and transforming them into command signals for supplying motion inputs to an external device. The hand controller provides motion input control of an external device relative to a dynamic user coordinate system, which is determined by the instantaneous orientation of the hand controller itself. The computational means translates the relative orientation change signals, such as roll, pitch, and yaw data from rate gyroscopes, into translation and rotation signals or commands that effect the movement of the external device's control point, so that, for example, translation can be effective simply by pointing the hand controller in a new direction of travel. Additional control over translation may be provided so that translation occurs only when, for example, a button is pressed on the controller or elsewhere. Orientation control of the external device about its control point may be accomplished mapping the relative orientation changes of the hand controller directly into relative orientation changes of the external device about the external device's control point. Thus, intuitive orientation control is provided by allowing the user to supply motion input information to the external device as though the external device were being manipulated directly. Orientation control may also be coordinated with additional controls, such as buttons to be pressed when orientation control is to occur.

Translation and orientation motion input may be provided simultaneously. The computational means may, however, filter the motion inputs provided by the hand controller so that motion along or about any of the coordinate axes, or any combination thereof, may be eliminated or otherwise constrained. The coordinate reference frame for these motion filters can, in the most general case, be defined to be any arbitrary fixed coordinate system. Means may be provided for defining and storing one or more of these arbitrary coordinate systems.

The motion input device in accordance with the invention allows the inputs to be provided to be independent of the configuration and kinematics of the external device, and further permits operation of the hand controller to be unaffected by such factors as the kinematic implementation of the motion inputs by the external device, the device's number of degrees of freedom or number of extended axes, the external device's manufacturer, or the implementation or configuration of the external device.

It is thus an object of the invention to provide an easy-to-use, intuitive spatial input device that allows a user to command translation and rotation of a movable object using simple hand motions.

It is a further object of this invention to provide a means for constraining commands from the spatial input device to allow better motion control.

It is a still further object of this invention to provide a spatial input device that provides a standard output that is easily converted into signals needed to direct different controllers.

These and other objects of the invention will become evident to one skilled in the art upon reading the following detailed description of the invention.

BRIEF DESCRIPTION OF THE DRAWINGS

FIG. 5 shows a vector $\vec{v}$ as it would be measured in both of the coordinate frames shown in FIG. 4, showing how the x, y, and z coordinates of a point p are different in the two coordinate frames.

FIGS. 6A and 6B show, respectively, two coordinate systems initially oriented identically, and the relationship of the axes after one coordinate system is rotated about the x-axis.

FIGS. 7A, 7B, 7C and 7D show a sequence of rotations of one coordinate systems relative to one another. In FIG. 7A, the two coordinate systems are aligned. In FIG. 7B, one of them has undergone a roll of the x axis. In FIG. 7C, the coordinate system that underwent the roll in FIG. 7B undergoes an additional pitch in the y axis. In FIG. 7D, the coordinate system that underwent the roll and pitch shown in FIG. 7C has undergone a yaw of the z axis.

FIG. 8 shows how a computing means can compute the orientation of the wand and the $F_{wand}$ coordinate frame relative to the $F_{world}$ coordinate frame at time $T_n$ when continuously given the sampled signals representing instantaneous changes in roll, pitch, and yaw.

DETAILED DESCRIPTION OF THE INVENTION

Figure 1:
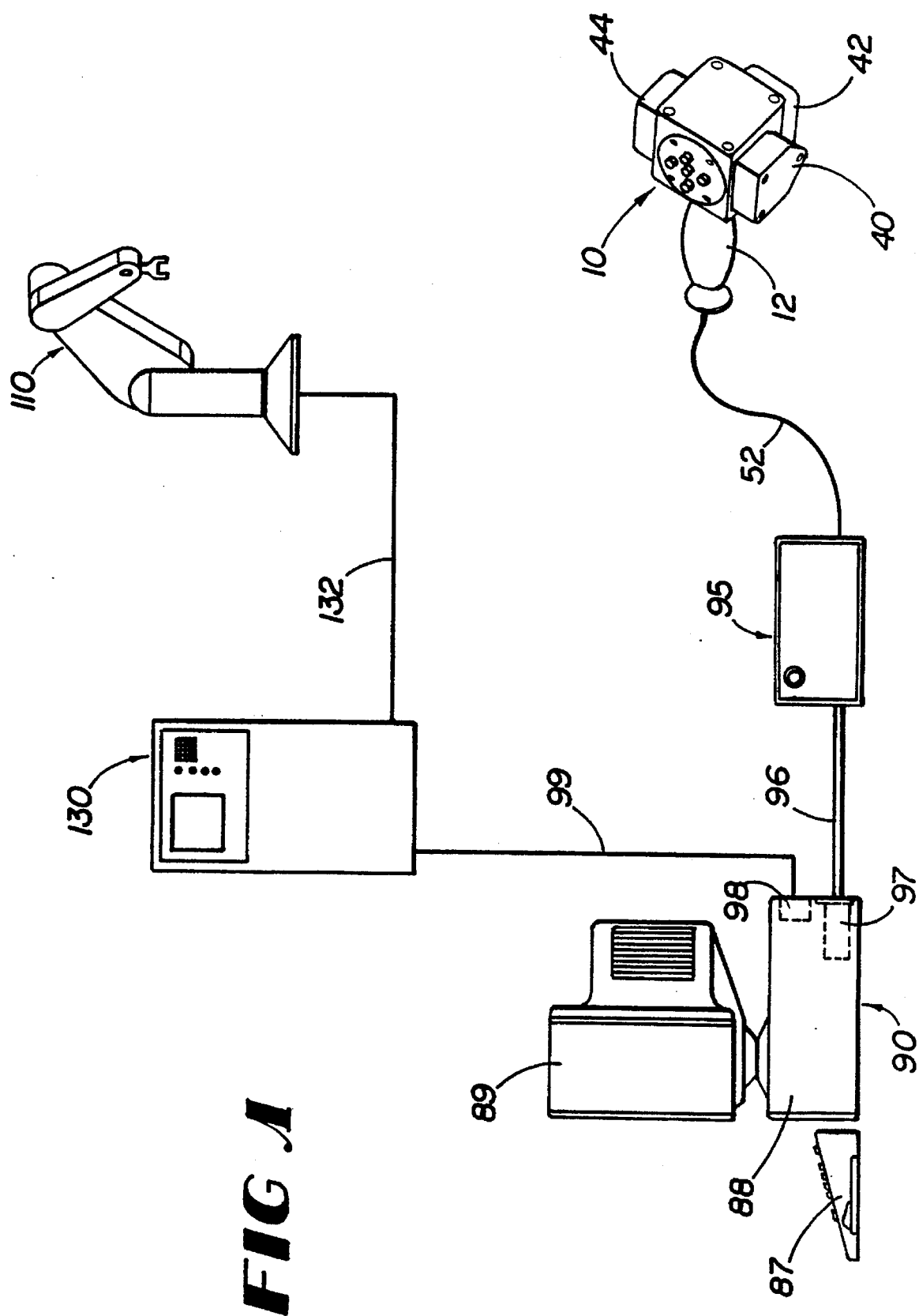
FIG. 1 is a pictorial block diagram of a typical system incorporating the inventive spacial input device.

A pictorial block diagram of a typical system incorporating a spacial input device in accordance with the invention is shown in FIG. 1. The system comprises a wand 10, an electronics interface unit 95, and a computing means 90. The computing means is in electronic communication with a conventional robot controller 130, which controls robot arm 110. Robot controller 130 and robot arm 110 are conventional, are not part of the invention, and may instead be replaced by other devices having real or virtual motions that can be controlled with suitable motion commands. Wand 10 has a plurality of fixedly mounted angular rate sensors 40, 42, and 44, which will be described in more detail below. Wand 10 is preferably electronically coupled by a multiconductor cable 52 to an electronic interface unit 95 which provides power to wand 10 and filters the output of the angular rate sensors 40, 42, and 44. Other functions may be provided, as is described in more detail below. It will, of course, be recognized that the functions of electronic interface unit 95 could be integrated into wand 10; however, because an operator will be manipulating wand 10, it is likely to be more convenient to house at least a portion of the electronics comprising electronic interface unit 95 outside of and separate from wand 10 itself.

Electronics interface unit 95 is electronically coupled by another preferably multiline cable 96 to a computing means 90. Computing means 90 preferably comprises a system unit 88 incorporating an Intel 80386 (TM) processor or better, and preferably an 80486 or better processor operating at 50–66 Mhz or faster. Computing means offering similar processing power and speed may also be used. Computing means 90 is provided with a display 89 and a keyboard 87 and/or other means operatively coupled with system unit 88 for communicating with an operator. The computing means 90 is further provided with data acquisition means 97 communicating with both the processor of system unit 90 and wand 10, the latter through electronics interface unit 95. The data received from wand 10 is processed in real time by system unit 90 in a manner to be explained in detail below, and resulting motion commands are communicated through an output port 98 (e.g., an RS-232C port) via a cable or other means to robot controller 130, where they are processed into servo commands for robot arm 110 and sent to the robot arm through a cable 132. These commands may be in the form of signals representing coordinate points to move to, or orientations and translations, depending upon the controller 130 and what type of commands it requires. Adapting the device to individual controllers 130 is a routine programming task, once the inventive techniques described herein are understood. It will further be recognized that computing means 90 may also store movement commands, so that repetitive tasks may be programmed and repeated as necessary. In addition, if the wand 10 is provided with a display device, such as a preferred embodiment described later in this description, computing means 90 may provide data to be sent over cable 96 back to wand 10 for display.

Figure 2:
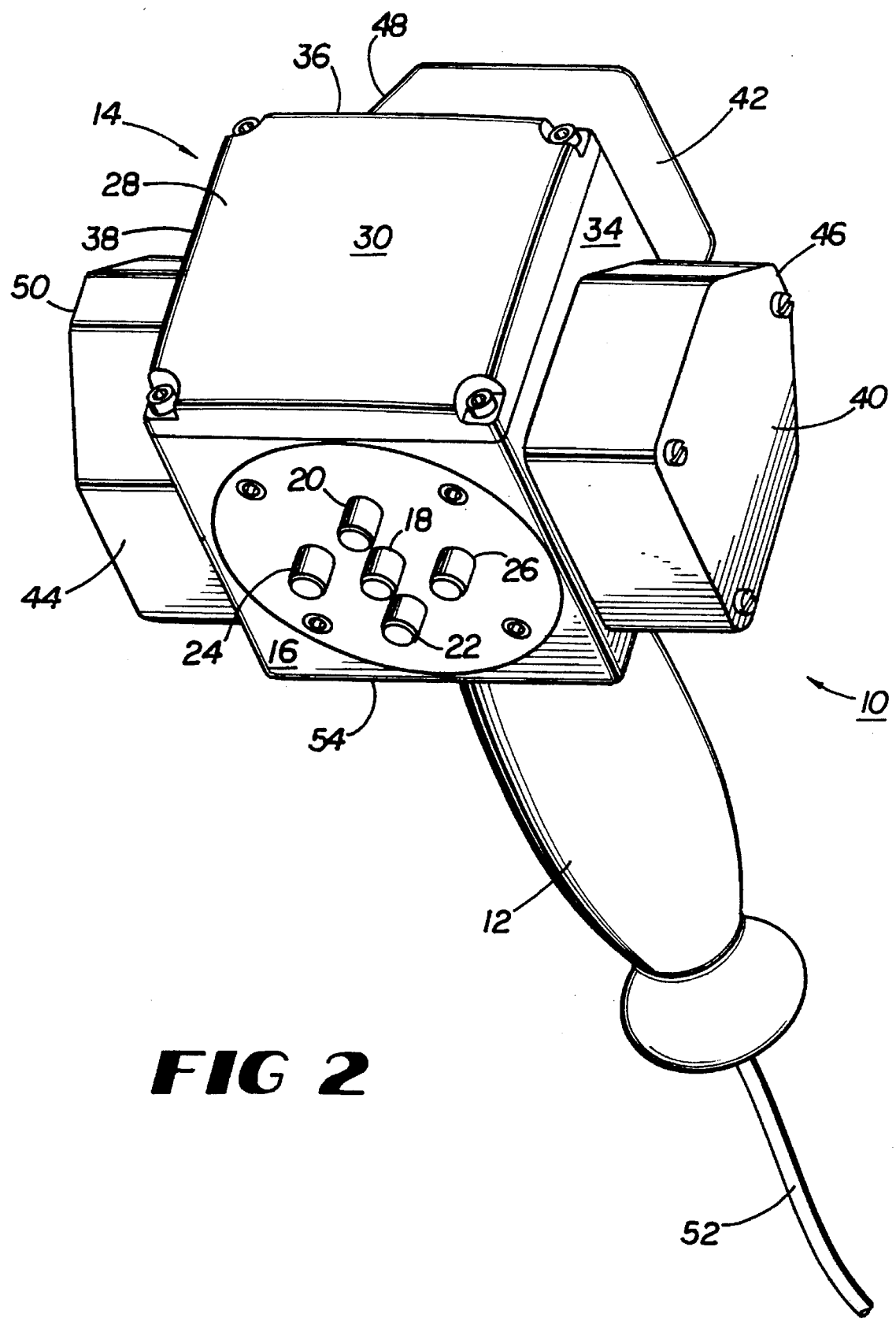
FIG. 2 is a perspective view of an embodiment of a wand suitable for use in the system of FIG. 1.

An embodiment of a wand suitable for use in the system of FIG. 1 is shown in perspective view in FIG. 2. Wand 10 comprises a handle 12 and a head 14. Handle 12 is contoured to conveniently be held by the hand. Head 14 is essentially cubical. One face 54 of head 14 is attached to handle 12 so that the plane of face 54 is perpendicular to the longitudinal axis of handle 12. Face 16 of head 14 is provided with momentary push-button switches 18, 20, 22, 24, and 26 that are within convenient reach of a user's thumb while the user is holding handle 12. Angular rate sensors 40, 42, and 44, preferably GyroChips (TM) from Systron Donner Inertial Division, Concord, Calif., are flush-mounted on faces 34, 36, and 38, respectively, of head 14. Face 28 is provided with an opening (not shown) covered by a plate 30, to permit access to wiring and electronics inside head 14. A multiconductor cable 52 passing through a hollow portion of handle 12 is provided for the supply of power to the angular rate sensors 34, 36, and 38 in head 14 and to provide output from wand 10 to computation means 90 (the latter not shown in FIG. 1). The multiconductor cable 52 also provides communication to the computation means 90 in the event any of the button switches on wand 10 are pressed, and may also provide output to a display on wand 10, as will be seen in another embodiment below.

Figure 3:
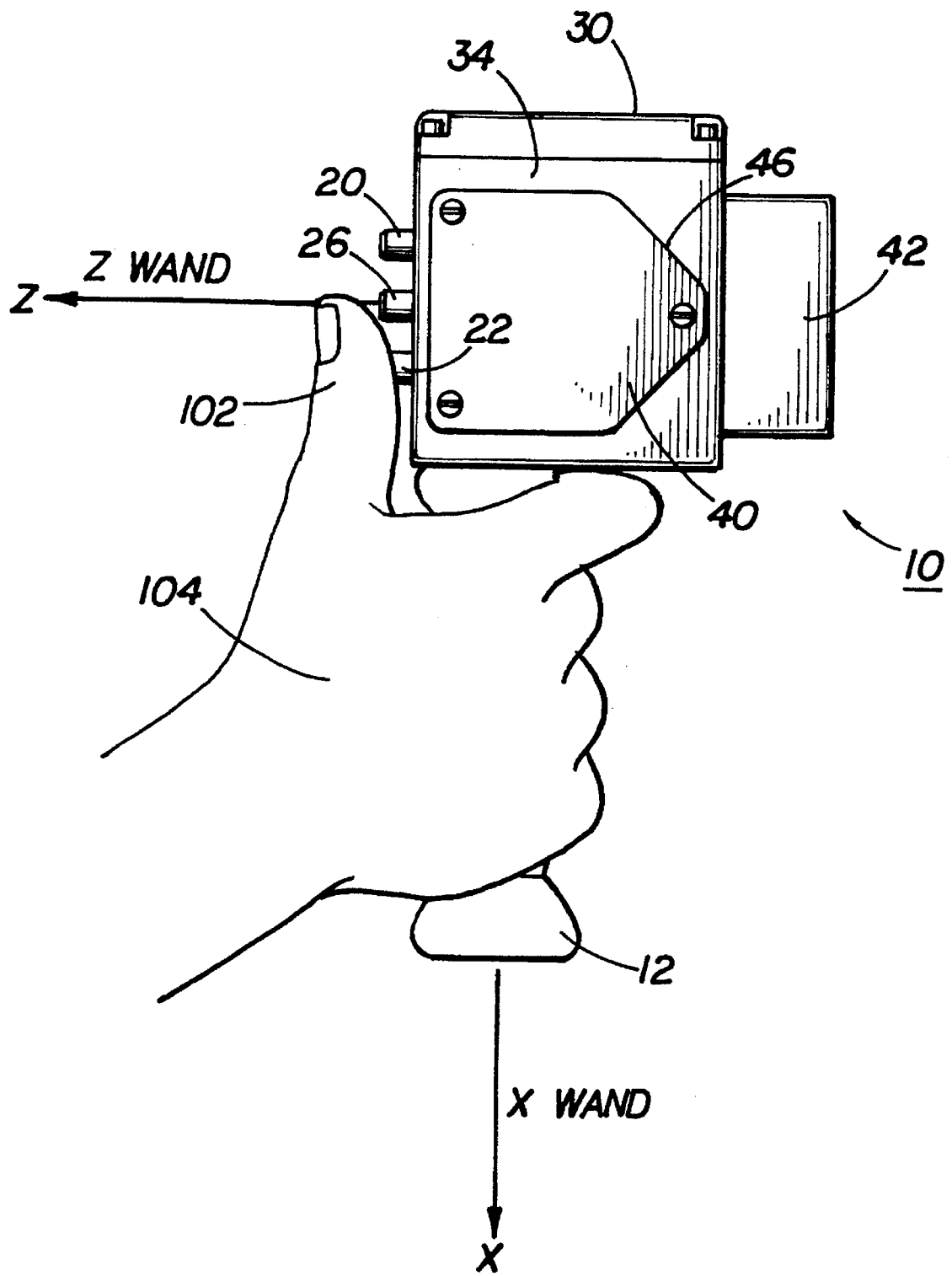
FIG. 3 is a view of a wand in a user's hand, showing the relationship of the user's thumb to the coordinate axes of the wand.

Angular rate sensors 40, 42, and 44, like conventional rate gyroscopes, detect inertial angular rate about an axis. For the preferred GyroChips illustrated in FIG. 2, the sensitive axis of each sensor is parallel to the mounting surface and oriented in the direction indicated by the wedge-shaped tips 46, 48, and 50 of their package. As shown in FIG. 2, the three angular rate sensors 40, 42, and 44 are mounted so that their sensitive axes are at right angles to each other, along axes $x_{wand}$, $y_{wand}$, and $z_{wand}$ of coordinate frame $F_{wand}$. Referring now to FIG. 3, when a user grips handle 12 with his or her hand 104, the user's thumb 102 points along the negative $x_{wand}$ axis. In the following discussion, $F_{world}$ denotes a fixed orthogonal coordinate frame in which the motion of the object to be moved can be described. $F_{wand}$ denotes a $\vec{v}$ coordinate frame fixed to the wand.

Figure 4:
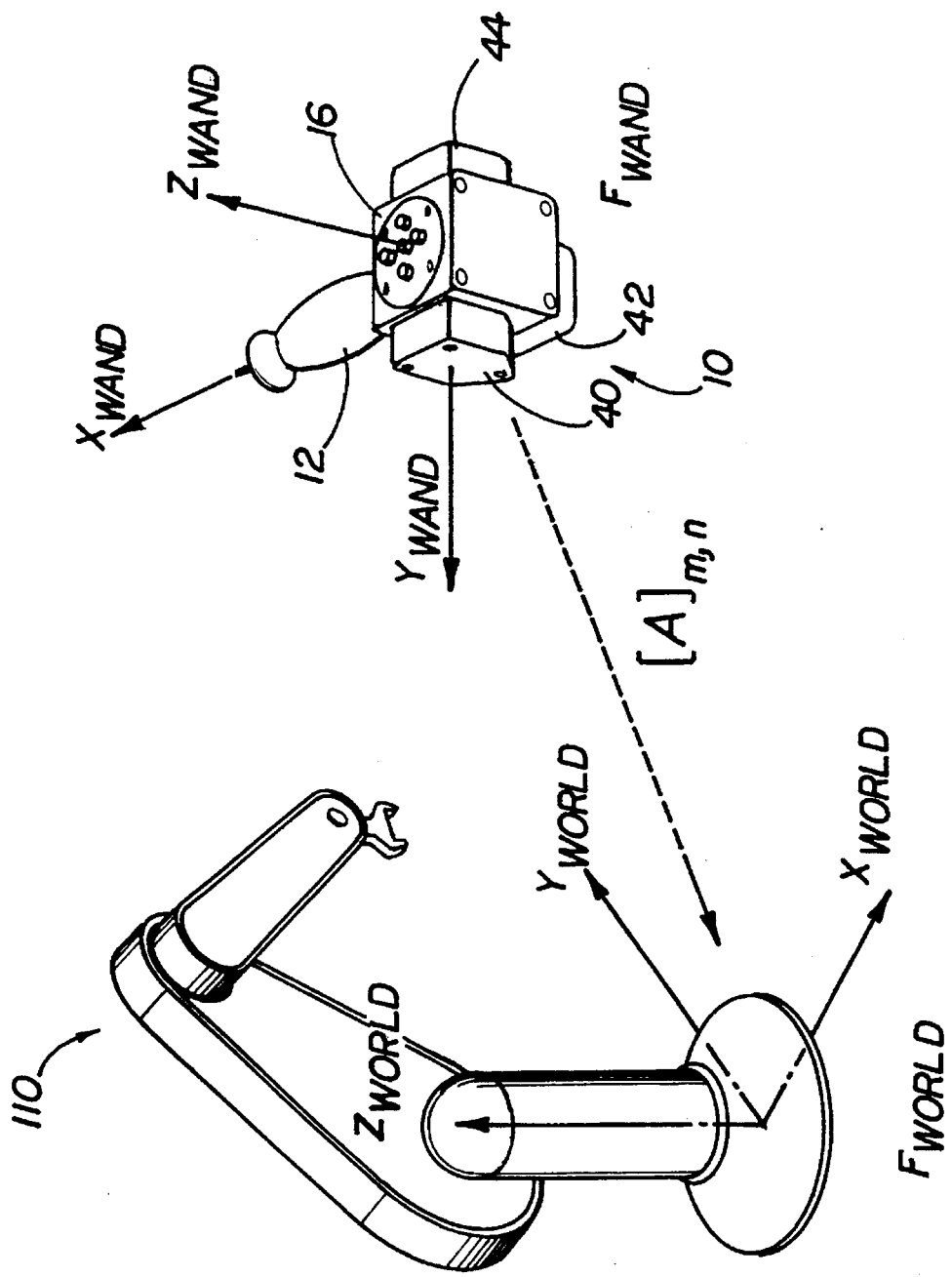
FIG. 4 is a diagram showing the relationship of the coordinate systems of a wand and an object to be controlled, in this case, a robot arm having a fixed world coordinate system.

The basis of the invention is to provide an intuitive method of moving an object (real or virtual) through space (correspondingly real or virtual) by use of an easily manipulated controller such as a hand controller or wand. To accomplish this goal, the two coordinate frames of reference are established as shown in FIG. 4. $F_{world}$ denotes a fixed orthogonal coordinate frame of, for example, a robot arm 110 having axes $X_{world}$, $Y_{world}$, and $Z_{world}$ by which the motion of the object to be moved can be described. (Although the invention is described in detail with respect to a robot arm and control thereof, it should be recognized that the same or similar technique could be used to control other objects, real or "virtual," as the case may be.) Fwand denotes a coordinate frame with respect to wand 10 having axes $X_{wand}$, $Y_{wand}$, and $Z_{wand}$ fixed to wand 10. For motions of wand 10 to be intuitively mapped to corresponding movements of an object (not shown) being manipulated by robot arm 110, it is necessary to establish a relationship between the orientation of $F_{wand}$ and $F_{world}$. A 3×3 coordinate transformation matrix can be employed for this purpose. Coordinate transformation matrices are used to determine the coordinates of a point or the components of a vector defined in one coordinate frame in terms of another coordinate frame. For example, given an arbitrary orientation of $F_{wand}$ relative to $F_{world}$, a vector $\vec{v}$ can be created to describe a point p, as shown in FIG. 5. Although $\vec{v}$ describes p in both reference frames, the corresponding x, y, z component values of $\vec{v}$ are different. The relationship can be defined by the following equation $$\left\{ \begin{array}{c} v_x \\ v_y \\ v_z \end{array} \right\}_{F_{world}} = [A] \left\{ \begin{array}{c} v_x \\ v_y \\ v_z \end{array} \right\}_{F_{wand}} \quad (\text{eq. 1})$$

where [A] is a 3×3 rotational transformation matrix which describes the orientation of the $F_{wand}$ coordinate frame relative to the $F_{world}$ coordinate frame, as pictorially indicated in FIG. 4. A rotational transformation matrix is composed of three orthogonal unit vectors known as the normal ($\vec{n}$), orient ($\vec{o}$) and approach ($\vec{a}$) vectors arranged in the form $$[A] = \begin{bmatrix} n_x & o_x & a_x \\ n_y & o_y & a_y \\ n_z & o_z & a_z \end{bmatrix}$$

The $\vec{n}$ vector components correspond to the $F_{wand}$ x-axis components when projected on to the $F_{world}$ coordinate frame. Likewise the $\vec{o}$ and $\vec{a}$ vector components correspond to the $F_{wand}$ Y and z-axis components, respectively, when projected on to the $F_{world}$ coordinate frame. Take, for example, the case where $F_{wand}$ and $F_{world}$ are initially oriented identically, as shown in FIG. 6A. Then, $F_{wand}$ is rotated about its x-axis by the angle $\psi$ as shown in FIG. 6B. The transformation matrix can be calculated as $$\vec{n} = (\vec{x}_{wand})_{F_{world}} = \left\{ \begin{array}{c} 1 \\ 0 \\ 0 \end{array} \right\} \quad (\text{eq. 2})$$

$$\vec{o} = (\vec{y}_{wand})_{F_{world}} = \left\{ \begin{array}{c} 0 \\ \cos\psi \\ \sin\psi \end{array} \right\} \quad (\text{eq. 2})$$

$$\vec{a} = (\vec{z}_{wand})_{F_{world}} = \left\{ \begin{array}{c} 0 \\ -\sin\psi \\ \cos\psi \end{array} \right\}$$

$$[A]_{0,1} = Rot(x,\psi) = \begin{bmatrix} 1 & 0 & 0 \\ 0 & \cos\psi & -\sin\psi \\ 0 & \sin\psi & \cos\psi \end{bmatrix}$$

Likewise, the transformation matrices corresponding to pure rotations about the y and z axes by an angle $\theta$ and $\phi$, respectively, are:

$$Rot(y,\theta) = \begin{bmatrix} \cos\theta & 0 & \sin\theta \\ 0 & 1 & 0 \\ -\sin\theta & 0 & \cos\theta \end{bmatrix} \quad (\text{eqs. 3,4})$$

$$Rot(z,\phi) = \begin{bmatrix} \cos\phi & -\sin\phi & 0 \\ \sin\phi & \cos\phi & 0 \\ 0 & 0 & 1 \end{bmatrix}$$

The transformation matrix, [A] for an arbitrary orientation of $F_{wand}$ relative to $F_{world}$ can be specified by a sequence set of rotations about the x, y, and z axes. This set of rotations, known as roll, pitch and yaw (RPY), is defined as a rotation about the x-axis by angle $\psi$ (roll), followed by a rotation about the y-axis by angle $\theta$ (pitch), and finally, a rotation about the z-axis by angle $\phi$ (yaw). Therefore, the rotation transformation matrix between times $t_m$ and $t_n$, can be calculated as follows:

$$[A]_{m,n} = RPY(\phi,\theta,\psi) = Rot(z,\phi)Rot(y,\theta)Rot(x,\psi) \quad (\text{eq. 5})$$

$$[A]_{m,n} = RPY(\phi,\theta,\psi) =$$

$$\begin{bmatrix} \cos\phi\cos\theta & \cos\phi\sin\theta\sin\psi - \sin\phi\cos\psi & \cos\phi\sin\theta\cos\psi + \sin\phi\sin\psi \\ \sin\phi\sin\theta & \sin\phi\sin\theta\sin\psi + \cos\phi\cos\psi & \sin\phi\sin\theta\cos\psi - \cos\phi\sin\psi \\ -\sin\theta & \cos\theta\sin\psi & \cos\theta\cos\psi \end{bmatrix}$$

For example, $F_{wand}$'s orientation relative to $F_{world}$ as shown in FIG. 5 can be described as the RPY sequence as shown in figure the sequence of FIGS. 7A–7D.

With the roll-pitch-yaw transformation matrix in mind, it will now be explained how the three orthogonal rate gyroscopes 40, 42, and 44 in FIG. 2 may be used to direct the control point of a robot's end effector. Handle 12, as indicated above, is designed to be held in the hand of a user. The user's thumb is directed along the longitudinal axis of the handle, thereby defining a vector direction in space, which, for the device shown in FIGS. 2 and 3, happens to be parallel to the negative x-axis of the $F_{wand}$ coordinate frame. The user's thumb is positioned for easy access to momentary push buttons 18, 20, 22, 24, and 26, one of which (preferably button 18) is used as a calibration switch. The user calibrates the wand by aligning it at least once with the $F_{world}$ coordinate system. (The $F_{world}$ X, Y and Z axes of the robot are pre-defined by the robot manufacturer.) Robot manipulators are generally installed such that the axes of the $F_{world}$ coordinate frame are marked at a convenient location on or near the robot and are readily apparent to the user. The user must initially calibrate wand 10 by orienting the x, y, and z axes of the $F_{wand}$ coordinate frame parallel to the X, Y, and Z axes of the robot's $F_{world}$ coordinate frame. When wand 10 is oriented in this manner, the user presses switch 18 on the wand, which provides a signal indicating that an initial transformation matrix is set to the Identity matrix and stored in the memory of a computer operatively connected to wand 10. After initialization, which is essentially instantaneous, switch 18 is released.

At this point, the user may position or orient the wand freely in space; however, it is essential to continuously track the orientation of $F_{wand}$ relative to the robot's $F_{world}$ coordinate frame. Rate gyros 40, 42, and 44 provide outputs indicative of the instantaneous rate of change in angles $\phi$, $\theta$, and $\phi$ over time. Thus, it is necessary to integrate the indicated outputs with respect to time to obtain these angles, and hence, the corresponding RYP transformation matrix. In practice, this can be done by using a Keithly Metrobyte DAS 1600G data acquisition board for data acquisition circuit 97 in FIG. 1. This board can readily sample the gyro output signals at a frequency of 250 Hz, and do so accurately enough in this application so that recalibration (e.g., from integration errors or noise) is rarely required.

Although it would be possible to sample each of the outputs from the orthogonal gyros 40, 42, and 44 simultaneously, it is sufficient, if sampling is rapid enough, to sample them in succession, modeling the movement of the wand as a sequence of roll, pitch, and yaw motions, such as in Eq. 7A–7D. Empirically, a 250 Hz sampling rate has been found to be sufficient to track the wand as it is manipulated through space by the human hand. Angular rate changes in between samples will be small and thus, rates can be modeled as constant during the sampling interval. Slower sampling rates can be used, although modeling errors may accumulate faster causing more frequent re calibrations of the wand. Higher rates are unlikely to be necessary and would increase the computational load of the system; however, higher rates could be used for greater accuracy and less frequent re calibration if required by an application.

Since the sampling interval is known, it is a simple matter to integrate the angular rate signals obtained into angular measurements of roll, pitch, and yaw. Assuming that, to a good approximation, the sampled rate is constant over the sampling period and is set at a sufficiently high frequency, integration is simply a matter of multiplying the observed roll pitch and yaw rates by the sampling time interval as follows $$\psi = \dot{\psi} \Delta T_s \qquad \text{(eq. 6)}$$

$$\theta = \dot{\theta} \Delta T_s \qquad \text{(eq. 7)}$$

$$\phi = \dot{\phi} \Delta T_s \qquad \text{(eq. 8)}$$

In Eq. 6, 7, and 8, the subscript $\Delta T_s$ denotes the sample rate interval of time. More accurate integration techniques may be utilized, but, are usually more computationally intensive. Although $\Delta T_s$, is normally constant by design, it need not be, in principle, as long as the interval for each sample is known. Once the roll, pitch, and yaw angles are known, they can be used to derive the RPY transformation matrix, $[A]_{m,n}$ for that specific time interval. (Note: the subscripts of the transformation matrix, $A_{m,n}$, denote the time interval between the m and n set of gyro output samples).

It becomes a simple matter to compute the orientation of the wand and the $F_{wand}$ coordinate frame relative to the $F_{world}$ coordinate frame at time $T_n$ when continuously given the sampled instantaneous changes in roll, pitch, and yaw. The process begins with setting the initial transformation matrix, $[A]_{0,1}$, to the identity matrix at the time of calibration. The next gyro output samples are then taken, integrated to find the new roll, pitch, and yaw angles, and the new RPY transformation matrix, $[A]_{1,2}$, is computed. The $[A]_{0,1}$ matrix is then pre multiplied by the $[A]_{1,2}$ matrix to form the total transformation matrix, $[A]_{0,2}$ which represents the orientation of the $F_{wand}$ coordinate frame relative to the $F_{world}$ coordinate frame at the end of the second time interval. As each sample of gyro output is taken, the total transformation matrix is updated by pre-multiplying by the current RPY transformation matrix, as shown in FIG. 8. This method allows the $F_{wand}$ coordinate frame's orientation, and thus the user's hand orientation, to be tracked over time as it moves through space.

So far, all that has been accomplished is to obtain a relationship of the orientation of wand 10 relative to the fixed set of coordinate axes of a robot. For this example. the robot controller is looking to receive relative motion data generated from the wand and its connected computer. The robot controller, which is connected to the wand's computer by a standard communication interface (i.e. RS 232), continuously receives relative motion inputs from the wand's computer as the end effector is moved. The relative motion data is in the form of $\Delta X, \Delta Y, \Delta Z, \Delta \Phi, \Delta \Theta, \Delta \Psi$ relative to the $F_{world}$ coordinate frame. Once the robot's controller receives a set of motion data, it will coordinate the motion of the robot so that the control point of the end effector will translate $\Delta X, \Delta Y, \Delta Z$, and orient $\Delta \Phi, \Delta \Theta, \Delta \Psi$ from its current position and orientation relative to the $F_{world}$ coordinate frame. The relative orientation data is easily computed. The current RPY angles, $\phi, \theta,$ and $\psi$, are the current changes in orientation that are required, however they are relative to the $F_{wand}$ coordinate frame. To transform the angles to the robot's Fworld coordinate frame, eq. 1 is used:

$$\left\{ \begin{array}{c} \Delta \Psi \\ \Delta \Theta \\ \Delta \Phi \end{array} \right\}_{F_{world}} = [A]_{0,n-1} \left\{ \begin{array}{c} \Delta \psi \\ \Delta \theta \\ \Delta \phi \end{array} \right\}_{F_{wand}}$$

The previous total transformation matrix, $[A]_{0,n-1}$, which is continuously updated and stored in the computers memory, is used with the current RPY angles since the changes are about the previous orientation of the $F_{wand}$ axes.

The angular rate sensors do not enable the tracking of the translational movement of wand 10 in space since they only measure rotations about a particular axis. This would appear to make it difficult to direct the translational movement of the robot's end effector by wand 10. However, the negative x-axis of $F_{wand}$, which is parallel to the direction the user's thumb points, provides a convenient direction vector for translational movement. The direction vector, together with a preprogrammed magnitude, can be used as a translational increment for the end effector. The vector magnitude can be pre-selected and entered into computing means 90 prior to programming a robot arm in accordance with the speed limitations of the robot arm and the data exchange rate between the robot controller and the computing means. (Actually, any convenient direction vector defined in the wand's coordinate system would do, but a vector parallel to the negative x-axis is especially preferable because it results in an intuitive translational direction i.e. the direction in which the thumb is pointing.) This translational method is analogous to a person driving a car where the person constantly steers the car in a desired direction as the accelerator of the car dictates the speed. Here, the user constantly steers the control point of the end effector with a selected speed. To convert the direction vector to relative motion data the computation is as follows $$\left\{ \begin{array}{c} \Delta X \\ \Delta Y \\ \Delta Z \end{array} \right\}_{F_{world}} = [A]_{0,n} \left\{ \begin{array}{c} -1 \\ 0 \\ 0 \end{array} \right\}_{F_{wand}} \qquad \text{(Eq. 9)}$$

The $[A]_{0,n}$ matrix is used to determine the current orientation of the direction vector. The relative translational data along with the relative orientation data can be continuously updated and downloaded over the communication interface to the robot controller in a signal format suitable for the particular controller. (Alternately, if the robot controller requires absolute coordinates rather than relative increments, initial absolute coordinate values can be incremented by the wand's computer and then downloaded to the robot controller.) The conversion in signal format can vary depending upon the type of device being controlled (e.g., a robot controller may require formats different from other types of controllers), and between different devices of the same type by the same or by different manufacturers. However, once the computations indicated above have been performed, the signal conversion can readily be coded in software by a competent programmer and output over a suitable communication channel to the controlled device.

It will be appreciated that the updating of the translation matrix must be continuous after the initial calibration of wand 10 to the robot's coordinate system if the orientation of the wand is to be tracked, and that, with the preferred computing means 90, the required computions described above can, by any competent programmer, be converted into a conventional program sufficiently fast to provide continuous tracking and storing of wand orientation, and/or translation, formatting and outputting of movement data to the robot controller or any other device having a specified movement command input format. However, it is equally clear that a user would normally not want a robot arm directed by wand 10 to be in continuous motion. To make wand 10 useful for most applications, at least one additional control must be added so that the user can start and stop the motion of the end effector as desired. Wand 10 provides a momentary push button switch 20, which, when pressed, causes the downloading of the motion data to the robot, and thus, causing movement of the end effector to occur. The user can therefore orient wand 10 in his hand to a preferred or more comfortable orientation, then, hold down push button 20 and effect a desired motion in the robot. Once obtaining the desired motion, the user can release button 20 to stop the robot's motion. During this time, the transformation matrix is being continually updated. Therefore, the user could then walk around the room, engage button 20, and induce motion in the direction in which the user's thumb points. The user has complete intuitive control of the robot's end effector at all times regardless of his position or orientation around the robot's work volume.

Additional controls may be added for the convenience of the operator. For example, push button 22 can be used to trigger reverse motion of the end effector by causing the controller to provide increments in the negative direction to which the user's thumb points. Movement at right angles to the direction in which the thumb points may be effected by additional buttons 26 and 24. These additional buttons may, by an easily determined transformation operation, be used to effect movement of the end effector in a similar manner as equation 9. Although not absolutely necessary, these additional direction buttons can severely limit user fatigue by providing an intuitive and convenient way of steering the end effector without actually having to orient the user's thumb in the particular desired direction.

Figure 9:
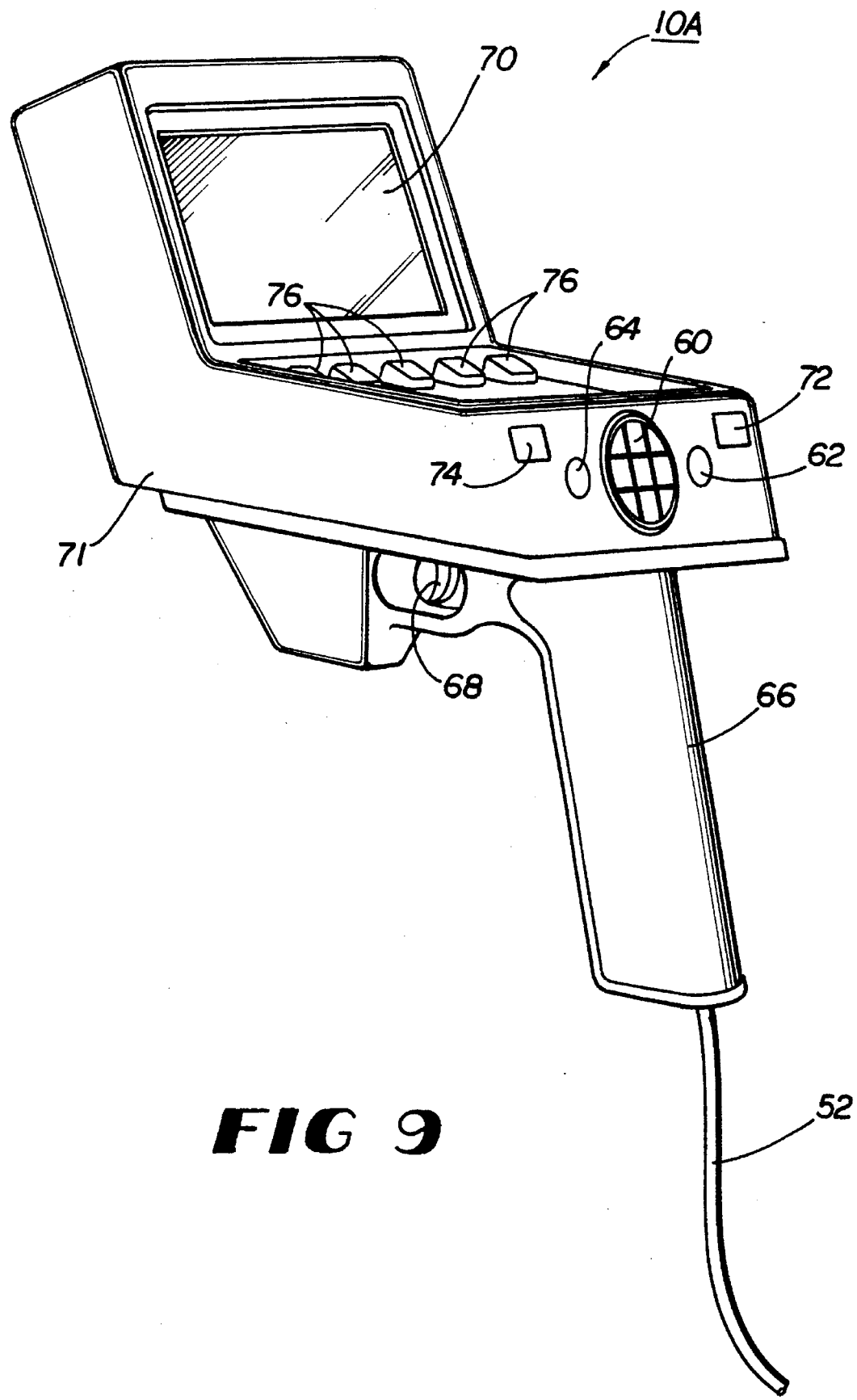
FIG. 9 is a view of an alternate embodiment of a wand, having additional control buttons and switches and a display that can be used for menus and other purposes.

A preferred embodiment 10A of such a wand, with a general purpose LCD display similar to that used in conventional teach pendants for displaying status information, is shown in FIG. 9. In this embodiment, the rate gyros are preferably orthogonally mounted inside wand body portion 71. An operator holds wand 10A by handle 66, with his or her index finger on trigger 68, which is preferably a "deadman" trigger, i.e., one that prevents any motion of the robot arm (or other controlled device) unless trigger 68 is activated. Non-translational movements of the wand could be permitted when trigger 68 is activated, provided they are enabled by the computational means (not shown). A two-dimensional rocker switch 60 (which may be similar in action to switches found in some video games) is used to control X and Y motion, and, as is the case with all other movement controls, may be disabled when trigger 68 is not activated. Rocker switch 60 takes the place of buttons 20, 22, 24, and 26 of the embodiment shown in FIG. 2. Two calibrate switches 72, 74 are provided, which may each perform the function of button 18 of FIG. 2.

Additional movement buttons may be provided for the operator's convenience. For example, buttons 62 and 64 in FIG. 9 may be used to control upward and downward movement, thereby allowing an operator to command and/or program such movement without having to make excessive repetitive motions with his arm. A series of buttons 76 may be provided to command the computation means to display a menu of commands on a display screen 70, which is preferably an LCD display. Buttons 76 and screen 70 thus can provide some or all of the traditional functions of conventional teach pendants. Of course, it will be recognized that the button definitions could be changed to fit various applications, or the computation means may be provided with programming capability to allow software programming and redifinition of the functions of some or all the various buttons and triggers of wand 10A.

Figure 10:
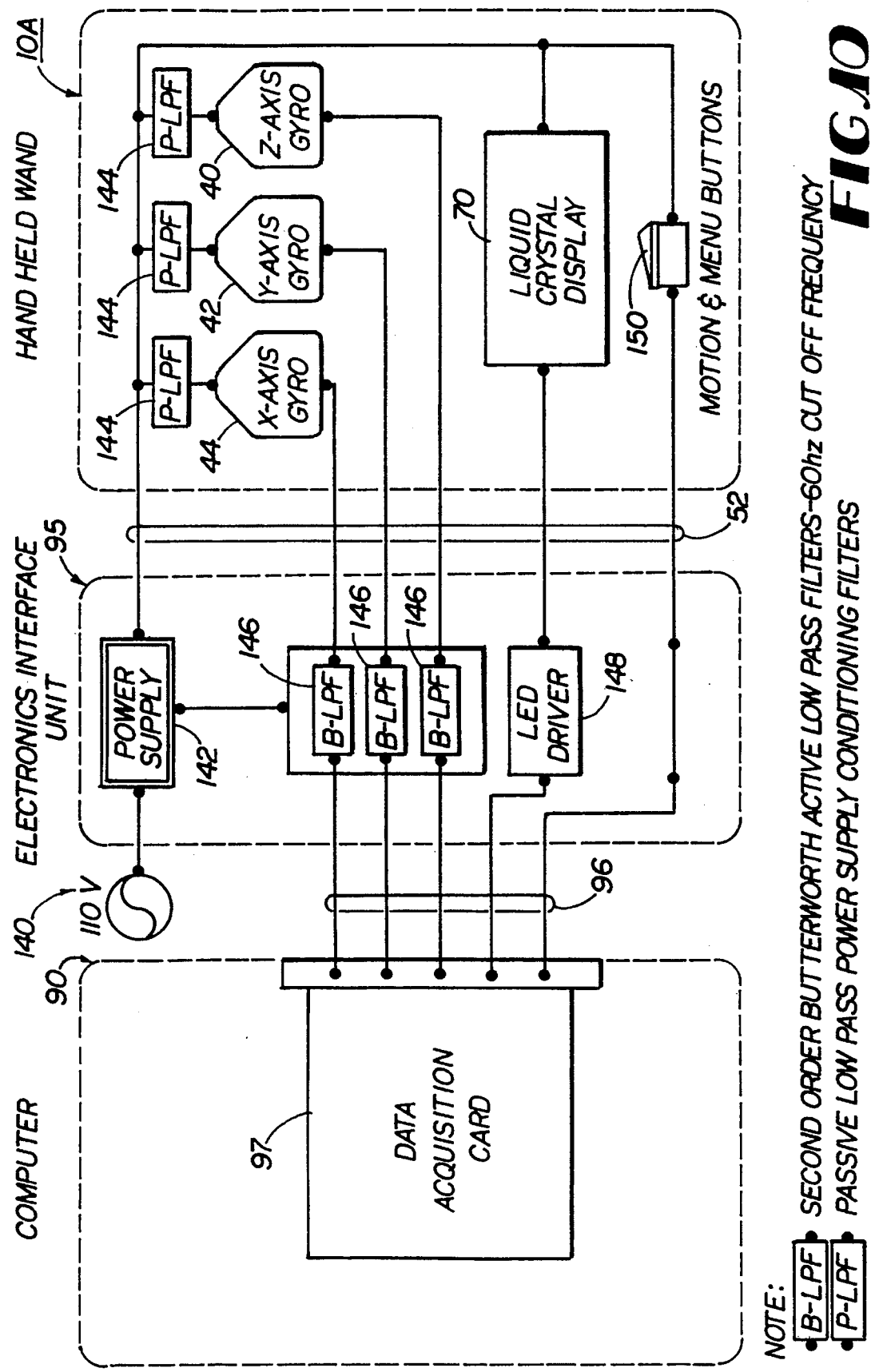
FIG. 10 is a simplified electrical schematic of a computing means, an electronic interface unit, and a wand in accordance with the invention.

A more detailed block diagram of the inventive system is shown in FIG. 10; this figure omits the robot arm and robot controller shown in FIG. 1. Electrically, wand 10A comprises a set of three angular rate sensors 40, 42, and 44, each supplied with power through a separate passive low pass power supply conditioning filter 144. Conditioning filters 144 serve to isolate the preferred rate gyros 40, 42, 44 from each other and from other interference that may be conducted through the power supplies. This power is derived from a power supply 142, preferably in an external electronics interface unit 95, which in turn is supplied by a conventional power source 140. Rate gyros 40, 42, 44 each output rate information, which is sent to electronics interface unit 95 for filtering in accordance with standard practice. Conventional second order Butterworth active low pass filters 146 are provided in electronics interface unit 95 for this purpose, where it has empirically been determined that a 60 Hz cut off frequency provides satisfactory noise immunity for the 250 Hz sampling rate required for robot control applications. Data acquisition card 97, as described above, samples the filtered output of the rate gyros 40, 42, 44 at the 250 Hz sampling rate. Motion and menu buttons 150 (which may include the various buttons, switches and triggers shown in wand 10 of FIG. 2 and/or wand 10A of FIG. 10) can simply provide open and closed continuity that can be sensed by and interpreted by computing means 90. Output may be optionally be provided from the computing means 90 to an optional LCD driver 148 in electronics interface unit 95, which in turn drives optional LCD display 70 to provide menus and/or other information to the operator.

Since the wand's computation means actually calculates the motion data and then sends the data sets to the robot's controller, its is a easy task to filter out components which are not desired. For example, if the user wished only to move the robot's end effector along the $F_{world}$ X-is, the $\Delta Y$, $\Delta Z$, $\Delta \Phi$, $\Delta \Theta$, $\Delta \Psi$ could be set to zero before the data set was sent to the robot controller. Similarly, if the user wanted to restrict motion to the X-Z plane of the $F_{world}$ coordinate system, the $\Delta Y$, $\Delta \Phi$, $\Delta \Theta$, $\Delta \Psi$ could be set to zero before the data was sent to the robot controller. Therefore, motion can be directed subjectively along any combination of the three translational and three rotational axes.

Figure 11:
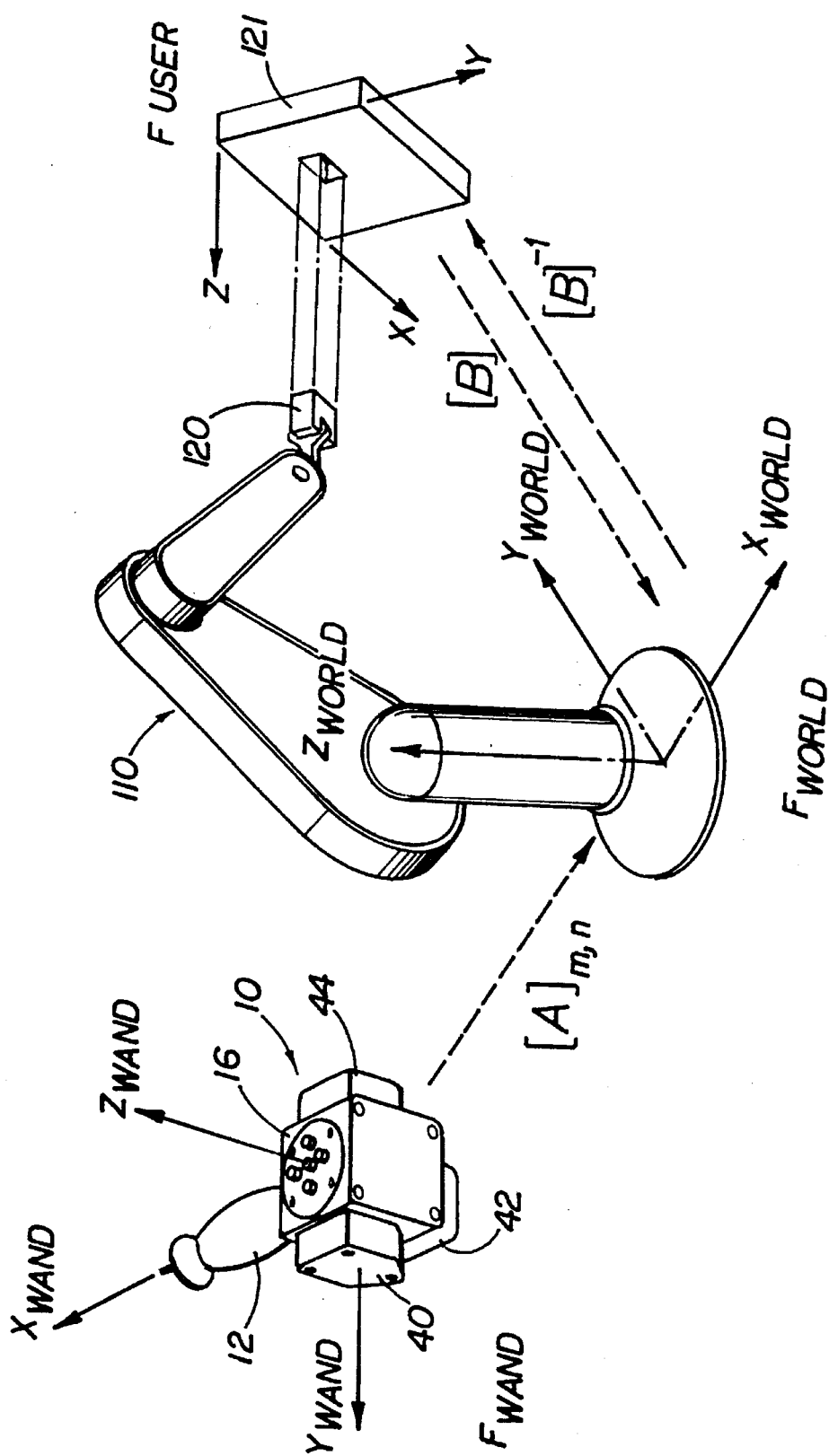
FIG. 11 is a drawing showing how the motions of an end effector can be guided with respect to another user-defined fixed coordinate system in space.

In addition, the motions of the end effector 120 can be guided with respect to another user-defined fixed coordinate system in space, e.g., a set of coordinates appropriate for a workpiece 121 as shown in FIG. 11. This coordinate frame, $F_{user}$, must have a defined transformation matrix, $[B]_{user}$, which describes its orientation with respect to the $F_{world}$ coordinate frame of the robot 110. Once established, the user may restrict motion of the robot 110 end effector 120 along any of the translational or rotational axes of the $F_{user}$ coordinate frame as previously described by use of motion filters. For example, the user may now restrict motion to a vector or plane that may not coincide with the X, Y, or Z axes or the X-Y, Y-Z, X-Z planes of the Fworld coordinate system. This is done by the following four step process. First, the $\Delta X$, $\Delta Y$, $\Delta Z$, $\Delta \Phi$, $\Delta \Theta$, $\Delta \Psi$ relative motion data set is generated as previously described. This data is then transformed into a data set relative to the $F_{user}$ coordinate frame by eq. 1. The data set is then filtered to user specifications, and then transformed back to a data set relative to the Fworld coordinate frame and sent to the robot controller.

Step 1: Transform translations and orientations relative to the $F_{user}$ coordinate frame $$\left\{\begin{array}{c}\Delta x\\ \Delta y\\ \Delta z\end{array}\right\}_{F_{user}}=[B]^{-1}\left\{\begin{array}{c}\Delta X\\ \Delta Y\\ \Delta Z\end{array}\right\}_{F_{world}}$$

$$\left\{\begin{array}{c}\Delta\psi\\ \Delta\theta\\ \Delta\phi\end{array}\right\}_{F_{user}}=[B]^{-1}\left\{\begin{array}{c}\Delta\Psi\\ \Delta\Theta\\ \Delta\Phi\end{array}\right\}_{F_{world}}$$

Step 2: Filter $\Delta Y$, $\Delta Z$, $\Delta\Theta$, $\Delta\Phi$ to only allow translations and rotations along $F_{user}$ x-axis $$\left\{\begin{array}{c}\Delta x\\ \Delta y\\ \Delta z\end{array}\right\}_{F_{user}}\rightarrow\text{Apply }y\text{ \& }z\text{ Filter}\rightarrow\left\{\begin{array}{c}\Delta x\\ 0\\ 0\end{array}\right\}_{F_{user}}$$

$$\left\{\begin{array}{c}\Delta\psi\\ \Delta\theta\\ \Delta\phi\end{array}\right\}_{F_{user}}\rightarrow\text{Apply }\theta\text{ \& }\phi\text{ Filter}\rightarrow\left\{\begin{array}{c}\Delta\psi\\ 0\\ 0\end{array}\right\}_{F_{user}}$$

Step 3: Transform data set back to the $F_{world}$ coordinate frame $$\left\{\begin{array}{c}\Delta X\\ \Delta Y\\ \Delta Z\end{array}\right\}_{F_{world}}=[B]\left\{\begin{array}{c}\Delta x\\ 0\\ 0\end{array}\right\}_{F_{user}}$$

$$\left\{\begin{array}{c}\Delta\Psi\\ \Delta\Theta\\ \Delta\Phi\end{array}\right\}_{F_{world}}=[B]\left\{\begin{array}{c}\Delta\psi\\ 0\\ 0\end{array}\right\}_{F_{user}}$$

Step 4: Send data to robot's controller

Of course, it will be recognized that other, more complex filtering and motion restrictions could be placed upon end effector 120, such as restricting motion to be along a curved surface, or confining the motion within a specified region of space. It is only required that sufficient processing power be available in the computation means to provide the desired filtering operation in real time.

The embodiments of the invention described above are provided for illustrative purposes only. Many modifications in keeping with the spirit of the invention will be apparent to one skilled in the art. For example, instead of a handheld controller, the rate gyros could be mounted on a helmet, which may be an especially appropriate for various artificial reality devices. In addition, it should be readily apparent to those skilled in the art that, with straightforward modifications, the rate gyros illustrated could be replaced by various types of angle sensors (which would not require integration over a sample period), such as angular position gyros, hall effect sensors, and electromagnetic or sonic triangulation sensors. In addition, calibration can take advantage of the fact that, with appropriate ones of these sensors, absolute angle offsets from the earth's gravity vector, the earth's magnetic field, or an externally applied field can be sensed. (These alternate types of sensors may be less suitable for industrial environments, as they tend at present to be more sensitive to noisy industrial environments.) Thus, the scope of the invention should not be considered as limited to the particular embodiments described, but rather should be determined only by reference to the claims below.

What is claimed is:

1. A system for controlling a movement of a three-dimensional workpiece in space, comprising:
    (a) freely moveable means for detecting motion in a plurality of directions and for generating signals representative of said motion;
    (b) means, coupled to said means for detecting motion, for acquiring said signals representative of said motion and for generating sampled signals therefrom;
    (c) computing means coupled to said means for acquiring said signal for receiving and processing said sampled signals and for translating said sampled signals into command signals for moving the workpiece, and;
    (d) means responsive to said command signals for effecting the movement of the workpiece in response to said command signals.

2. The system of claim 1, wherein said means for detecting motion comprises a plurality of angular rate sensors affixed to a wand, and said signals representative of said motion comprises signals representative of roll, pitch and yaw about orthogonal axes.

3. The system of claim 2, wherein said means for detecting motion comprises calibration means that can be activated by a user for indicating that the orthogonal axes are aligned in a selected direction in space.

4. The system of claim 3, wherein the computing means processes the sampled signals by computing a transformation matrix.

5. The system of claim 3, wherein said means for detecting motion further comprises command means that can be activated by a user for causing the computing means to direct motion of the workpiece in a selected direction determined by a present orientation of the orthogonal axes.

6. The system of claim 2, wherein said means for detecting motion further comprises command means that can be activated by a user for causing the computing means to direct motion of the workpiece in a selected direction determined by a present orientation of the orthogonal axes.

7. The system of claim 1, wherein the processing by the computing means includes storing said command signals and sending said stored command signals to the means for effecting the movement of the workpiece so that said movement of the workpiece is effected at a later time.

8. A system for processing and generating movement commands to be sent to a robot controller controlling a movement of an end effector, the system comprising:
    (a) freely moveable means for detecting motion in a plurality of directions and for generating signals representative of said motion;
    (b) means, coupled to said means for detecting motion, for acquiring said signals representative of said motion and for generating sampled signals therefrom; and
    (c) computing means coupled to said means for acquiring said signal for receiving and processing said sampled signals and for translating said sampled signals into command signals to be sent to the robot controller.

9. A method for controlling a motion of an end effector of robot, comprising the steps of:
    (a) orienting a motion detector in a calibration direction;
    (b) setting an initial transformation matrix to an identity matrix while the motion detector is oriented in the calibration direction;
    (c) sampling and integrating roll, pitch and yaw signals from the motion detector to determine the orientation of the motion detector as a function of time;

(d) updating the transformation matrix in accordance with the orientation of the motion detector; thereby generating a sequence of transformation matrices; and (e) directing a movement of the end effector in accordance with the sequence of transformation matrices.

10. The method of claim 9, further comprising the step of storing the transformation matrix to allow the movement of the end effector to occur at a later time.

11. The method of claim 9, further comprising the step of computing a sequence of direction vectors from an initial direction vector and the sequence of transformation matrices, and wherein the direction of the movement of the end effector in accordance with the sequence of transformation matrices comprises translational motion of the end effector in accordance with the sequence of direction vectors.

12. The method of claim 11, further comprising the step of storing the transformation matrix to allow the movement of the end effector to occur at a later time.

13. The method of claim 12, further comprising the step of interrupting the directing of end effector movement in accordance with a state of a switch.

14. The method of claim 9, wherein the updating of the transformation matrix comprises a filtering of the translation matrix to restrict the direction of movement of the end effector.

15. The method of claim 9, wherein the movement of the end effector being directed includes the orientation of the end effector.

16. A device suitable for outputting both real-time and stored three-dimensional direction control signals, comprising:

(a) a hand-held wand for defining a wand coordinate system;

(b) a plurality of angle rate sensor means fixedly attached to the wand for generating orientation signals corresponding to a movement of the wand coordinate system;

(c) operator input means for generating indication signals indicating that:
   (1) the wand is oriented in a calibration direction; and
   (2) the orientation of the wand is to be translated into a direction control signal;

(d) a computing means responsive to the orientation of the wand and input signals for computing a sequence of transformation matrices therefrom, for computing a sequence of orientation vectors therefrom, and for storing and outputting three-dimensional control signals in accordance with a direction vector and the indication signals.

17. The method of claim 16, wherein the computing means further comprises means for inputting and storing a value corresponding to a predetermined speed, and in which the computing means is responsive to the indication signals, the orientation signals and the stored value for outputting three dimensional control signals corresponding to a movement at the predetermined speed.

* * * * *